(12) United States Patent
Cookson

(10) Patent No.: US 12,420,587 B2
(45) Date of Patent: Sep. 23, 2025

(54) CASTER ADJUSTMENT ASSEMBLY FOR A WHEELCHAIR

(71) Applicant: PERMOBIL, INC., Lebanon, TN (US)

(72) Inventor: Spencer Cookson, West Richland, WA (US)

(73) Assignee: PERMOBIL, INC., Lebanon, TN (US)

( * ) Notice: Subject to any disclaimer, the term of this patent is extended or adjusted under 35 U.S.C. 154(b) by 21 days.

(21) Appl. No.: 18/478,502

(22) Filed: Sep. 29, 2023

(65) Prior Publication Data

US 2025/0108662 A1  Apr. 3, 2025

(51) Int. Cl.
  *B60B 33/04* (2006.01)
  *A61G 5/10* (2006.01)
  *B60B 33/00* (2006.01)

(52) U.S. Cl.
  CPC ............. *B60B 33/04* (2013.01); *A61G 5/10* (2013.01); *B60B 33/0005* (2013.01)

(58) Field of Classification Search
  CPC ....... B60B 33/04; B60B 33/0005; A61G 5/10; Y10T 403/32368; Y10T 403/32361; Y10T 403/32262; Y10T 403/32418; E05D 11/015
  See application file for complete search history.

(56) References Cited

U.S. PATENT DOCUMENTS

| | | | | |
|---|---|---|---|---|
| 3,846,912 A | * | 11/1974 | Newbould | B23Q 16/08 33/1 D |
| 4,186,905 A | * | 2/1980 | Brudy | B60R 1/0617 248/478 |
| 4,773,503 A | * | 9/1988 | Purkapile | E06C 1/32 16/323 |

(Continued)

FOREIGN PATENT DOCUMENTS

| | | |
|---|---|---|
| DE | 20217484 U1 | 1/2003 |
| EP | 0992226 A2 | 4/2000 |

(Continued)

OTHER PUBLICATIONS

International Patent Office Search Report and Written Opinion for Application No. PCT/US2024/048903 dated Dec. 20, 2024 (15 pages).

*Primary Examiner* — Jason W San
*Assistant Examiner* — Matthew J Sullivan
(74) *Attorney, Agent, or Firm* — Michael Best & Friedrich LLP

(57) ABSTRACT

A caster wheel adjustment assembly for a wheelchair includes a first mounting member coupled to a wheelchair frame member, a second mounting member coupled to a caster wheel, and an angle adjustment member defining a first side opposite a second side. The first side defines a plurality of first projections, and the second side defines a plurality of second projections. The first plurality of projections includes a different number of projections than the second plurality of projections. The angle adjustment member is configured to interlock with first mounting member and the second mounting member. The first plurality of projections selectively interlock with a third plurality of projections on the first mounting member, and the second plurality of projections selectively interlock with a fourth plurality of projections on the second mounting member.

20 Claims, 10 Drawing Sheets

(56) References Cited

U.S. PATENT DOCUMENTS

| | | | | |
|---|---|---|---|---|
| 4,969,768 A * | 11/1990 | Young | | F16M 13/022 403/97 |
| 5,016,851 A * | 5/1991 | Koskinen | | B60R 11/0241 248/278.1 |
| 5,039,118 A * | 8/1991 | Huang | | B62B 9/20 403/96 |
| 5,123,768 A * | 6/1992 | Franklin | | F16C 11/10 403/96 |
| 5,154,435 A * | 10/1992 | Chiu | | B62B 1/045 280/DIG. 6 |
| 5,520,474 A * | 5/1996 | Liu | | F16C 11/10 403/92 |
| 5,867,911 A * | 2/1999 | Yates | | A01D 34/90 30/296.1 |
| 6,286,968 B1 * | 9/2001 | Sailer | | B60R 1/0617 248/478 |
| 6,629,801 B2 * | 10/2003 | Cheng | | B62B 9/20 403/96 |
| 7,047,655 B2 * | 5/2006 | Larsson | | B43L 7/12 33/495 |
| 7,128,511 B2 * | 10/2006 | Hewgill | | F16B 39/24 411/533 |
| 7,493,675 B2 * | 2/2009 | Lin | | H04M 1/0216 16/334 |
| 7,523,904 B2 * | 4/2009 | Carnevali | | F16M 13/02 248/176.1 |
| 7,536,750 B2 * | 5/2009 | Lin | | G06F 1/1686 16/334 |
| 8,256,786 B2 * | 9/2012 | Ludovici | | B60B 33/04 16/18 R |
| 8,584,320 B2 * | 11/2013 | Lin | | G06F 1/1681 248/292.12 |
| 9,103,150 B1 * | 8/2015 | Wong | | F16M 11/14 |
| 9,310,021 B2 * | 4/2016 | Hennessey | | F16M 11/10 |
| 9,526,366 B1 * | 12/2016 | Kempshall | | A47G 29/083 |
| 9,566,995 B2 * | 2/2017 | Strauss | | B62B 7/06 |
| 9,833,377 B2 * | 12/2017 | Smed | | A61H 3/04 |
| 10,125,807 B2 * | 11/2018 | Furu-Szekely | | F16B 39/282 |
| 10,329,814 B1 * | 6/2019 | Tamer | | E05D 11/1007 |
| 10,448,770 B1 * | 10/2019 | Kempshall | | F16B 2/10 |
| 10,448,771 B1 * | 10/2019 | Kempshall | | F16B 2/18 |
| 11,034,265 B2 * | 6/2021 | Leportier | | B60N 2/2252 |
| 11,058,246 B1 * | 7/2021 | Kempshall | | F16B 2/10 |
| 11,299,390 B2 * | 4/2022 | Benetti | | B68C 1/04 |
| 11,920,625 B2 * | 3/2024 | Cattaneo | | F16B 39/282 |
| 2004/0179891 A1 * | 9/2004 | Watkins | | F16C 11/10 403/96 |
| 2012/0263519 A1 * | 10/2012 | Kotula | | B25J 15/0061 403/84 |
| 2013/0189019 A1 * | 7/2013 | Kotula | | F16M 11/048 403/84 |
| 2014/0259532 A1 * | 9/2014 | Millard | | E05D 11/1028 16/326 |

FOREIGN PATENT DOCUMENTS

| | | |
|---|---|---|
| EP | 3287314 A1 | 2/2018 |
| JP | 2009291278 A | 12/2009 |
| WO | 2013131188 A1 | 9/2013 |
| WO | 2017191005 A1 | 11/2017 |

* cited by examiner

CASTER ADJUSTMENT ASSEMBLY FOR A WHEELCHAIR

FIELD

The present disclosure relates to a wheelchair. More specifically, the present disclosure relates to a caster wheel adjustment assembly configured to adjust an orientation of a caster wheel relative to a frame member.

BACKGROUND

Wheelchairs are generally known in the art. Wheelchairs generally include, among other elements, a frame assembly, a pair of rear wheels, and a pair of caster wheels. Wheelchairs can include adjustability to facilitate customization to users of different heights and/or sizes. During adjustment, each caster wheel can be moved out of a preferred alignment with the frame assembly. Accordingly, there is a need for a system adjust the alignment of each caster wheel relative to the frame assembly.

SUMMARY

In one example of an embodiment, a caster wheel adjustment assembly for a wheelchair includes a first mounting member coupled to a frame member of the wheelchair, a second mounting member coupled to a caster wheel, and an angle adjustment member defining a first side opposite a second side, the first side defining a plurality of first projections, and the second side defining a plurality of second projections, the plurality of first projections include a different number of projections than the plurality of second projections. The first mounting member defines a plurality of third projections, the first and third projections are configured to interlock in response to the angle adjustment member being selectively fastened to the first mounting member. The second mounting member defines a plurality of fourth projections, the second and fourth projections are configured to interlock in response to the angle adjustment member being selectively fastened to the second mounting member. In response to rotation of the angle adjustment member relative to the first mounting member and/or the second mounting member, the caster wheel is angularly adjusted relative to the frame member.

In another example of an embodiment, a caster wheel adjustment assembly for a wheelchair includes an angle adjustment member defining a first side opposite a second side, a first mounting member coupled to a frame member of the wheelchair, and a second mounting member coupled to a stem of a caster wheel. The first side defines a first plurality of projections, and the second side defining a second plurality of projections. The first plurality of projections are each spaced apart by a first angular distance. The second plurality of projections are each spaced apart by a second angular distance that is different than the first angular distance. The first mounting member defines a third plurality of projections complimentary to the first plurality of projections. The second mounting member defines a fourth plurality of projections complimentary to the second plurality of projections. The first mounting member is configured to selectively fasten to the angle adjustment member. The first and third plurality of projections are configured to interlock. The second mounting member is configured to selectively fasten to the angle adjustment member. The second and fourth plurality of projections are configured to interlock. In response to rotation of the angle adjustment member relative to the first mounting member and/or the second mounting member, the angular position of the caster wheel stem changes relative to the frame member.

Other aspects of the disclosure will become apparent by consideration of the detailed description and accompanying drawings.

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

Figure 1:
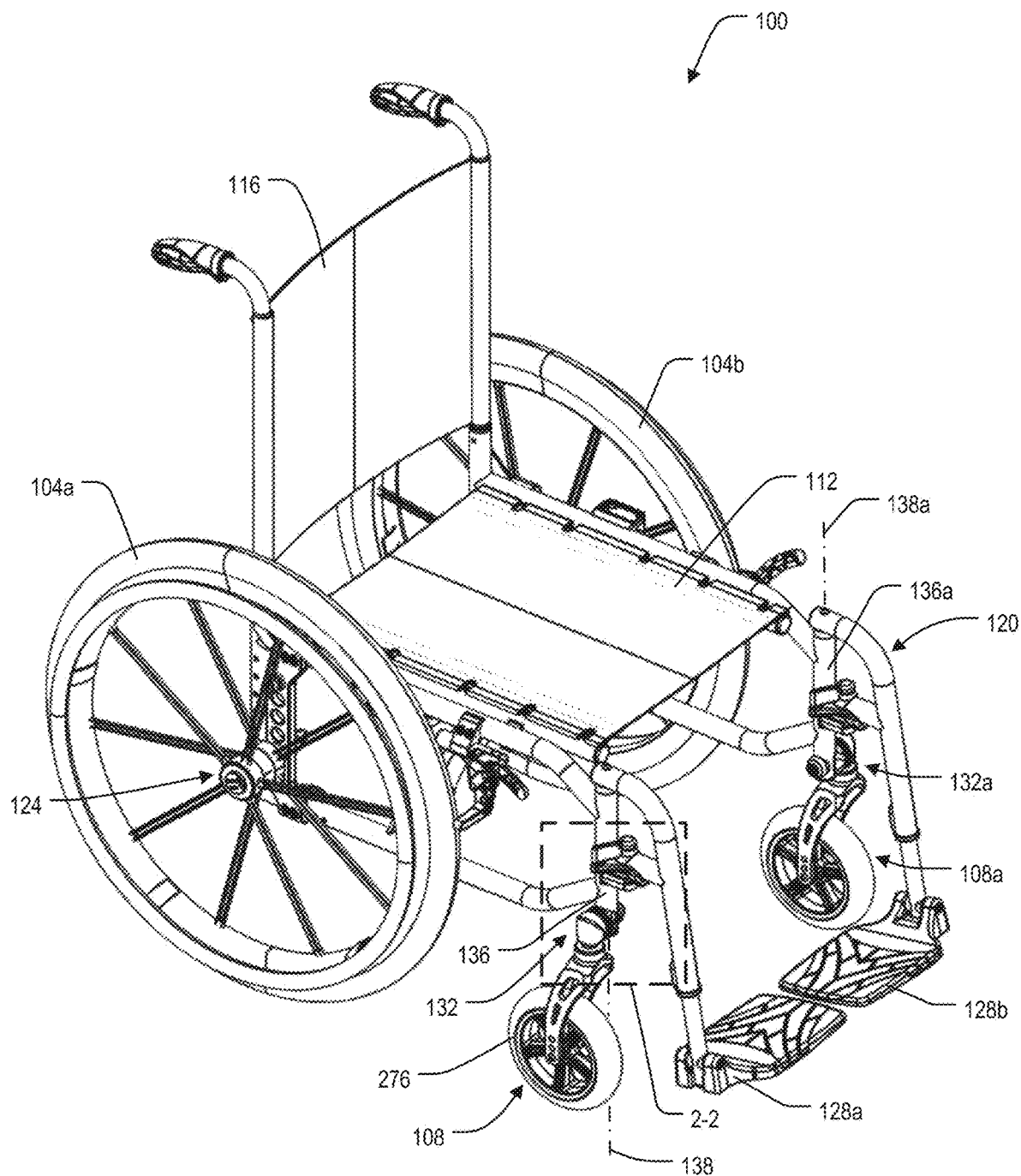
FIG. 1 is a perspective view of an example of an embodiment of a wheelchair.

With reference to FIG. 1, an embodiment of a wheelchair 100 is illustrated. The wheelchair 100 includes a pair of rear wheels 104a, 104b (also referred to as drive wheels 104a, 104b or first wheels 104a, 104b), a pair of caster wheel assemblies 108, 108a (also referred to as casters 108, 108a, caster wheels 108, 108a, or second wheels 108, 108a), a seat support 112 (also referred to as a seat pan 112), a back support 116, a frame assembly 120, an axle assembly 124, and a pair of foot supports 128a, 128b. Each drive wheel 104a, 104b is coupled to the axle assembly 124. The axle assembly 124 is adjustably fastened to the frame assembly 120. Each caster wheel assembly 108, 108a is fastened to the frame assembly 120. The seat support 112, back support 116, and foot supports 128a, 128b are respectively coupled (or fastened) to the frame assembly 120. The seat support 112 can be formed of any suitable material (e.g., fabric, upholstery, cloth, carbon fiber, titanium, aluminum, or other metal or metal alloy, textile, etc.). The foot supports 128a, 128b are illustrated as separate components that separately connect to the frame assembly 120. Each foot support 128a, 128b is configured to support a respective foot of a user. In other examples of embodiments, the wheelchair 100 can include a single foot support (not shown) connected to the frame assembly 120 that is configured to support both feet of the user. It should be appreciated that the wheelchair 100, or one or more components thereof, can be formed of aluminum, titanium, steel, a metal alloy, carbon fiber, or any other suitable material. In addition, while the wheelchair 100 is illustrated as a manual wheelchair, in other examples of embodiments, the wheelchair 100 can be any suitable type of wheelchair, including, but not limited to, a powered wheelchair, a manual wheelchair, a collapsible wheelchair, etc.

With continued reference to FIG. 1, each caster wheel assembly 108, 108a is respectively coupled to the frame assembly 120 by a respective caster wheel adjustment assembly 132, 132a. More specifically, each caster wheel adjustment assembly 132, 132a is coupled to a respective frame member 136, 136a. Each frame member 136, 136a is defined by (or is a component of) the frame assembly 120. Each frame member 136, 136a also defines a respective frame axis 138, 138a. It should be appreciated that each caster wheel adjustment assembly 132, 132a is identical. The only difference is the illustrated orientation of the caster wheel adjustment assemblies 132, 132a, as they are mirror images of each other. Accordingly, for purposes of brevity, the disclosure below describes components associated with the caster wheel adjustment assembly 132. It should be appreciated that the caster wheel adjustment assembly 132a is the same as the caster wheel adjustment assembly 132. More specifically, the caster wheel adjustment assembly 132a has identical components with the same identification numbers as caster wheel adjustment assembly 132, only with the sub-identifier "a." It should be understood that the wheelchair 100 will incorporate a plurality of caster wheel adjustment assemblies 132, 132a, each associated with an associated caster wheel 108, 108a.

Figure 2:
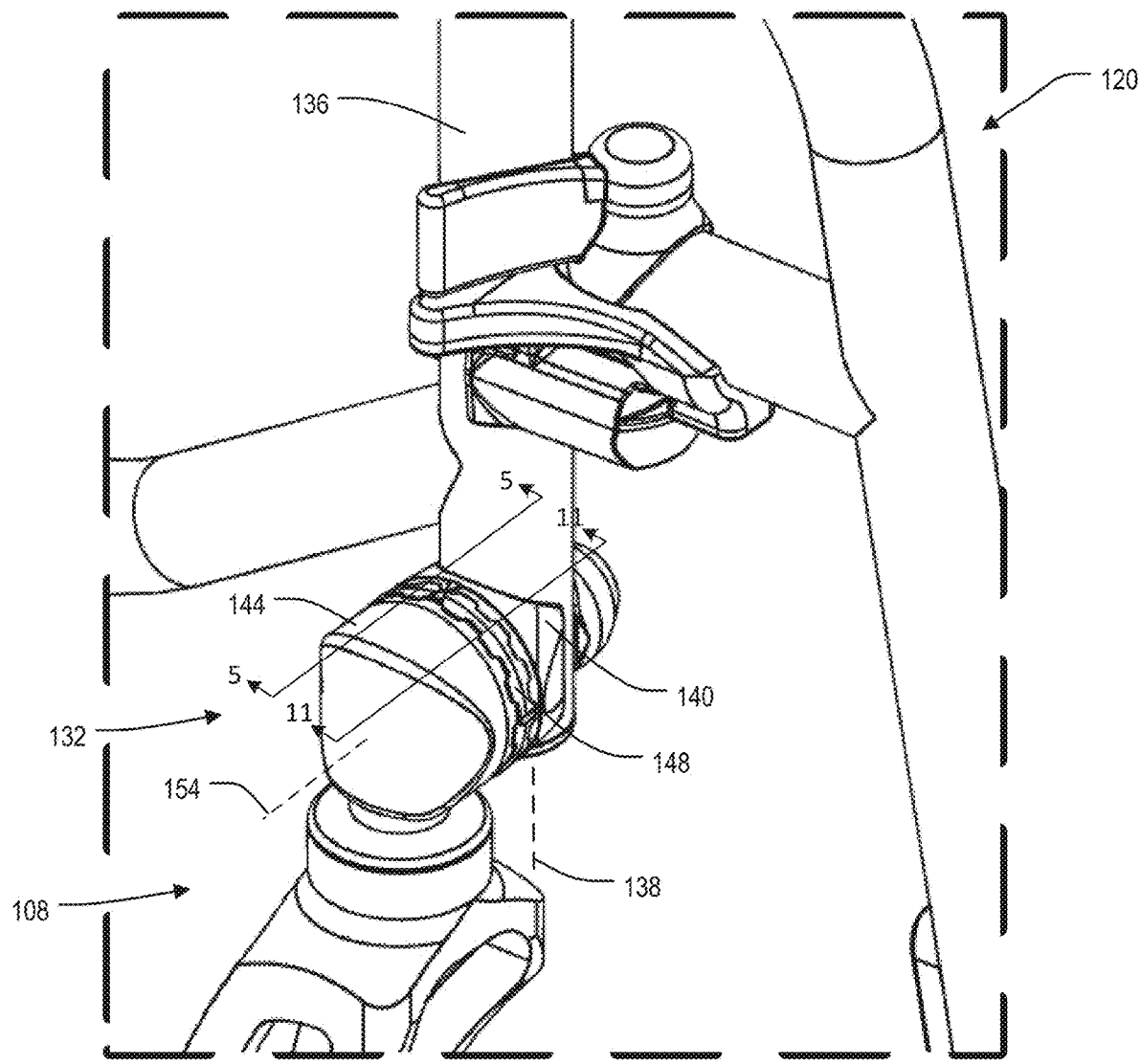
FIG. 2 is a magnified perspective view of a portion of the wheelchair of FIG. 1 illustrating a portion of a frame assembly, a portion of a caster wheel assembly, and a caster wheel adjustment assembly, which is shown in broken line region 2-2 of FIG. 1.

With reference now to FIG. 2, the caster wheel adjustment assembly 132 is illustrated in greater detail. The caster wheel adjustment assembly 132 includes a first mounting member 140, a second mounting member 144, and an angle adjustment member 148. The first mounting member 140 is coupled to the frame member 136. The second mounting member 144 is coupled to the caster wheel assembly 108. More specifically, the second mounting member 144 is coupled to a stem 152 (shown in FIGS. 3 and 4) of the caster wheel assembly 108. The angle adjustment member 148 is positioned between the first mounting member 140 and the second mounting member 144. Stated another way, the angle adjustment member 148 is sandwiched between the first and second mounting members 140, 144. In addition, the angle adjustment member 148 is selectively and adjustably coupled to each of the first mounting member 140 and the second mounting member 144. The caster wheel adjustment assembly 132 defines an adjustment axis 154. In the illustrated embodiment, the adjustment axis 154 is oriented perpendicular to the frame axis 138.

Figure 3:
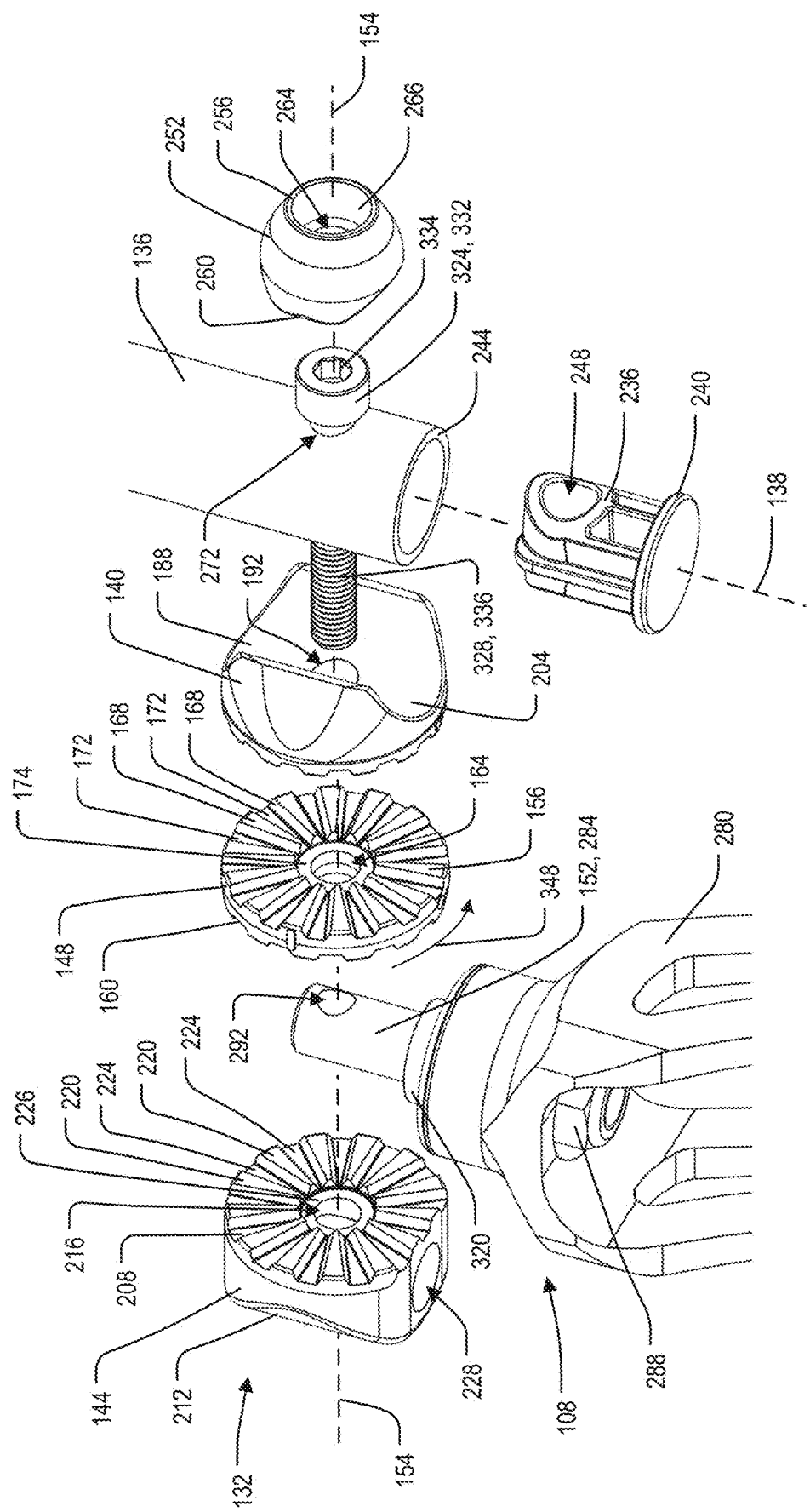
FIG. 3 is a partially exploded view of the caster wheel adjustment assembly of FIG. 2 illustrating a first side of an angle adjustment member.

With reference to FIG. 3, the angle adjustment member 148 includes a first side 156 and a second side 160. The second side 160 is positioned opposite the first side 156. The angle adjustment member 148 also defines a central aperture 164 (also referred to as a third aperture 164). The central aperture 164 extends through the first and second sides 156, 160. The adjustment axis 154 extends through the central aperture 164. More specifically, the adjustment axis 154 defines a center of the central aperture 164.

The first side 156 of the angle adjustment member 148 defines a plurality of first projections 168. The first projections 168 extend radially from the central aperture 164. The first side 156 of the angle adjustment member 148 also defines a first plurality of recesses 172. The first recesses 172 extend radially from the central aperture 164. In the illustrated embodiment, the first plurality of projections 168 and the first plurality of recesses 172 alternate around a circumference of the angle adjustment member 148. Stated another way, one first projection 168 is positioned between two adjacent first recesses 172. Similarly, one first recess 172 is positioned between two adjacent first projections 168. In other examples of embodiments, the plurality of first projections 168 and the plurality of first recesses 172 can be arranged in any suitable or desired orientation.

With continued reference to FIG. 3, the first side 156 defines a first alignment recess 174 (also referred to as an angle adjustment member alignment recess 174). The first alignment recess 174 is illustrated as an annular recess (or a circular recess). However, in other embodiments, the first alignment recess 174 can be any suitable shape or geometry. The first alignment recess 174 is positioned adjacent the central aperture 164, and more specifically is concentric with the central aperture 164. In other examples of embodiments, the first alignment recess 174 can be positioned at any suitable position (or positions) on the first side 156 of the angle adjustment member 148.

Figure 4:
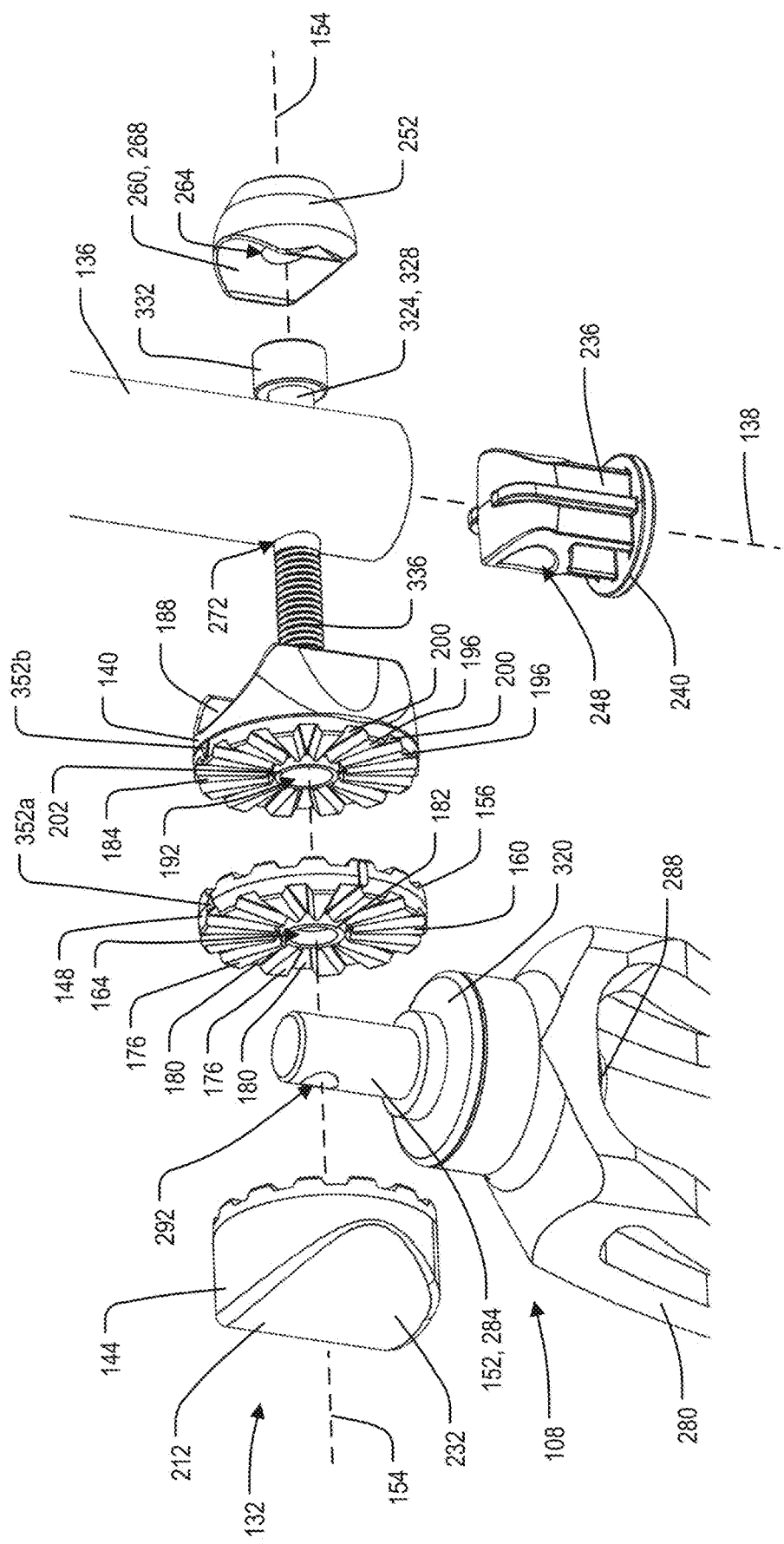
FIG. 4 is a partially exploded view of the caster wheel adjustment assembly of FIG. 2 illustrating a second side of the angle adjustment member.

With reference now to FIG. 4, the second side 160 of the angle adjustment member 148 defines a plurality of second projections 176. The second projections 176 extend radially from the central aperture 164. The second side 160 of the angle adjustment member 148 also defines a second plurality of recesses 180. The second recesses 180 extend radially from the central aperture 164. In the illustrated embodiment, the plurality of second projections 176 and the plurality of second recesses 180 alternate around a circumference of the angle adjustment member 148. Stated another way, one second projection 176 is positioned between two adjacent second recesses 180. Similarly, one second recess 180 is positioned between two adjacent second projections 176. In other examples of embodiments, the plurality of second projections 176 and the plurality of second recesses 180 can be arranged in any suitable or desired orientation.

With continued reference to FIG. 4, the second side 160 defines a second alignment projection 182 (also referred to as an angle adjustment member alignment projection 182). The second alignment projection 182 is an annular projection (or a circular projection). However, in other embodiments, the second alignment projection 182 can be any suitable shape or geometry. The illustrated second alignment projection 182 is positioned adjacent the central aperture 164, and more specifically is concentric with the central aperture 164. The illustrated second alignment projection 182 is positioned opposite the first alignment recess 174 (shown in FIG. 3). In other examples of embodiments, the second alignment projection 182 can be positioned at any suitable position (or positions) on the second side 160 of the angle adjustment member 148.

With continued reference to FIG. 4, the first mounting member 140 includes a third side 184 (also referred to as a first side 184) and a mounting side 188 (also referred to as a second side 188). The mounting side 188 is positioned opposite the third side 184. The first mounting member 140 defines a first aperture 192. The first aperture 192 extends through the third and mounting sides 184, 188. The adjustment axis 154 extends through the first aperture 192. More specifically, the adjustment axis 154 defines a center of the first aperture 192. The third side 184 defines a plurality of third projections 196. The third projections 196 extend radially from the first aperture 192. The third side 184 also defines a plurality of third recesses 200. The third recesses 200 extend radially from the first aperture 192. In the illustrated embodiment, the plurality of third projections 196 and the plurality of third recesses 200 alternate around a circumference of the third side 184 of the first mounting member 140. Stated another way, one third projection 196 is positioned between two adjacent third recesses 200. Similarly, one third recess 200 is positioned between two adjacent third projections 196. In other examples of embodiments, the plurality of third projections 196 and the plurality of third recesses 200 can be arranged in any suitable or desired orientation. In addition, the plurality of third projections 196 and plurality of third recesses 200 are arranged in an orientation that is complimentary to the orientation of the plurality of first projections 168 and the plurality of first recesses 172. The complimentary orientations allow the plurality of first projections 168 to interlock (or mesh or engage or interlink) with the plurality of third projections 196. More specifically, the plurality of first projections and recesses 168, 172 mesh (or interlock) with the plurality of third projections and recesses 196, 200, as discussed further below.

Figure 5:
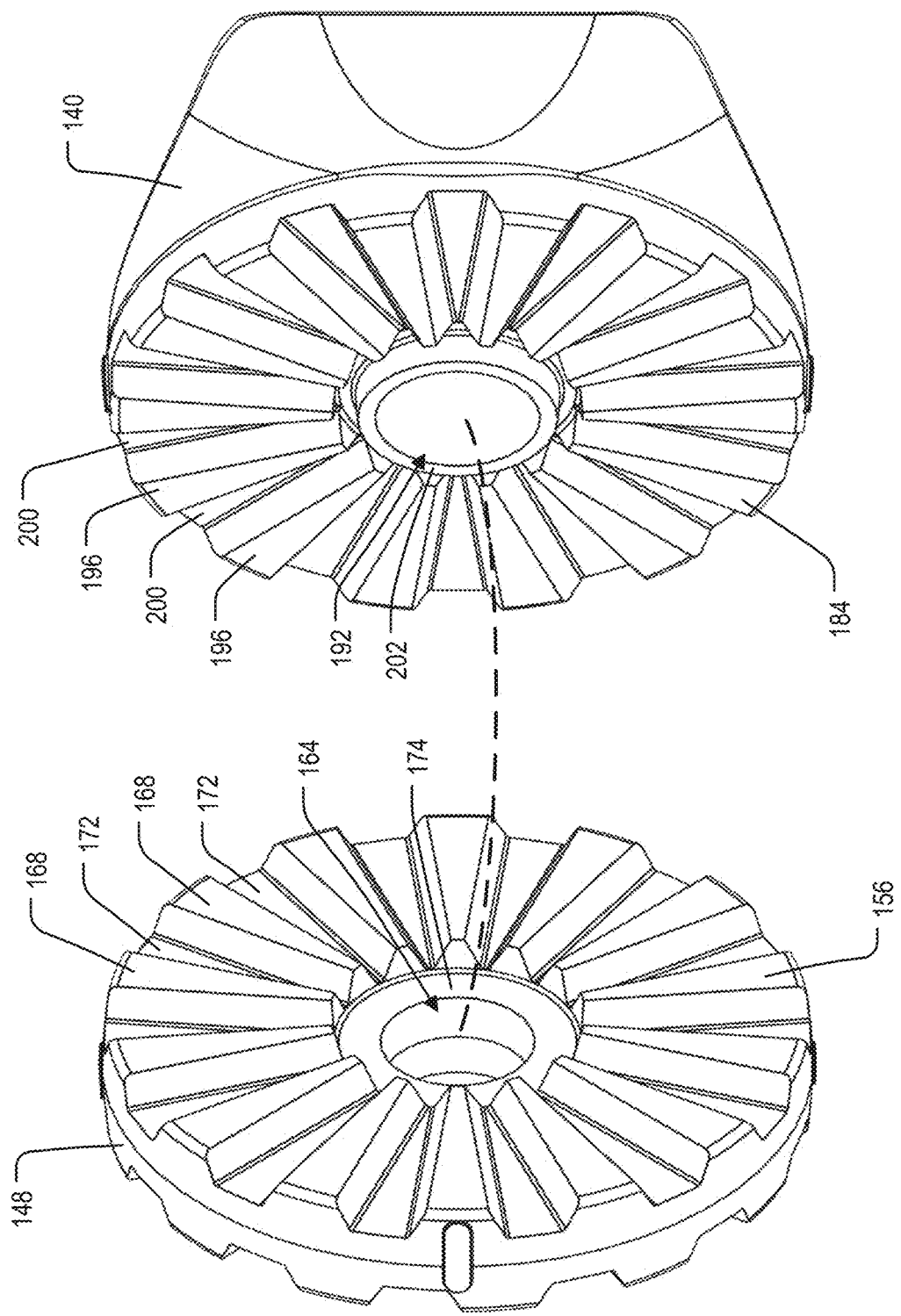
FIG. 5 is a perspective view of the angle adjustment member and a first mounting member of the caster wheel adjustment assembly of FIG. 2 in a disengaged configuration, the angle adjustment member and the first mounting member shown as oriented at an angle relative to each other to illustrate respective sides that are configured to interlock.

With reference to FIGS. 4-5, the third side 184 defines a first alignment projection 202 (also referred to as a mounting member alignment projection 202). The first alignment projection 202 is illustrated as an annular projection (or a circular projection). However, in other embodiments, the first alignment projection 202 can be any suitable shape or geometry. The first alignment projection 202 has a shape that is complimentary to the first alignment recess 174. This facilitates the first alignment recess 174 receiving the first alignment projection 202. Engagement of the first alignment recess and projection 174, 202 assists with alignment and engagement between the angle adjustment member 148 and the first mounting member 140. In addition, the engagement assists with alignment of the central aperture 164 and the first aperture 192. Further, the engagement assists with a proper orientation of the angle adjustment member 148 relative to the first mounting member 140 such that the first side 156 and the third side 184 are in complimentary engagement. The first alignment projection 202 is positioned adjacent the first aperture 192, and more specifically is concentric with the first aperture 192. In other examples of embodiments, the first alignment projection 202 can be positioned at any suitable position (or positions) on the third side 184 of the first mounting member 140. In these examples of embodiments, the position and/or orientation of the first alignment projection(s) 202 is complimentary to the position and/or orientation of the first alignment recess(es) 174 such that the first alignment recess(es) 174 can each receive a corresponding first alignment projection(s) 202. In one or more examples of embodiments, the first alignment projection 202 can be positioned on the first side 156, while the first central recess 174 can be positioned on the third side 184. Stated another way, the first alignment projection 202 is positioned on the angle adjustment member 148 and the first alignment recess 174 is positioned on the first mounting member 140. Stated yet another way, the first side 156 of the angle adjustment member 148 includes one of the first alignment recess 174 or the first alignment projection 202, and the third side 184 includes the other of the first alignment projection 202 or the first alignment recess 174.

With reference back to FIG. 3, the mounting side 188 of the first mounting member 140 defines a mounting surface 204. The mounting surface 204 is shaped to engage the frame member 136. More specifically, the mounting surface 204 has a shape that is complimentary to the frame member 136 (or at least a portion of the frame member 136). In the illustrated embodiment, the mounting surface 204 defines an arcuate, concave shape, and is configured to receive a convex portion of the cylindrical frame member 136. In other examples of embodiments, the mounting surface 204 can be any suitable shape (e.g., flat, rectangular, etc.) that is complimentary to the frame member 136 (or portion thereof) to facilitate engagement. In other examples of embodiments, there may be one or more additional components (e.g., a washer, a damping pad, etc.) positioned between the mounting side 188 and the frame member 136 to assist with engagement.

With continued reference to FIG. 3, the second mounting member 144 includes a fourth side 208 (also referred to as a first side 208) and an outer side 212 (also referred to as a second side 212). The outer side 212 is oriented opposite the fourth side 208. The second mounting member 144 defines a second aperture 216. The second aperture 216 extends through the fourth side 208 and into the second mounting member 144. In the illustrated embodiment, the second aperture 216 does not extend entirely through the second mounting member 144 (or through the outer side 212), shown in FIG. 4. The adjustment axis 154 extends through the second aperture 216. More specifically, the adjustment axis 154 defines a center of the second aperture 216. The fourth side 208 defines a plurality of fourth projections 220. The fourth projections 220 extend radially from the second aperture 216. The fourth side 208 also defines a plurality of fourth recesses 224. The fourth recesses 224 extend radially from the second aperture 216. In the illustrated embodiment, the plurality of fourth projections 220 and the plurality of fourth recesses 224 alternate around a circumference of the fourth side 208 of the second mounting member 144. Stated another way, one fourth projection 220 is positioned between two adjacent fourth recesses 224. Similarly, one fourth recess 224 is positioned between two adjacent fourth projections 220. In other examples of embodiments, the plurality of fourth projections 220 and the plurality of fourth recesses 224 can be arranged in any suitable or desired orientation. In addition, the plurality of fourth projections 220 and plurality of fourth recesses 224 are arranged in an orientation that is complimentary to the orientation of the plurality of second projections 176 and the plurality of second recesses 180. The complimentary orientations allow the plurality of second projections 176 to interlock (or mesh or engage or interlink) with the plurality of fourth projections 220. More specifically, the plurality of second projections and recesses 176, 180 to mesh (or interlock) with the plurality of fourth projections and recesses 220, 224.

The fourth side 208 defines a second alignment recess 226 (also referred to as a mounting member alignment recess 226). The second alignment recess 226 is illustrated as an annular recess (or a circular recess). However, in other embodiments, the second alignment recess 226 can be any suitable shape or geometry. The second alignment recess 226 has a shape that is complimentary to the second alignment projection 182. This facilitates the second alignment recess 226 receiving the second alignment projection 182. Engagement of the second alignment projection and recess 182, 226 assists with alignment and engagement between the angle adjustment member 148 and the second mounting member 144. In addition, the engagement assists with alignment of the central aperture 164 and the second aperture 216. Further, the engagement assists with a proper orientation of the angle adjustment member 148 relative to the second mounting member 144 such that the second side 160 and the fourth side 208 are in complimentary engagement. The second alignment recess 226 is positioned adjacent the second aperture 216, and more specifically is concentric with the second aperture 216. In other examples of embodiments, the second alignment recess 226 can be positioned at any suitable position (or positions) on the fourth side 208 of the second mounting member 144. In these examples of embodiments, the position and/or orientation of the second alignment recess(es) 226 is complimentary to the position and/or orientation of the second alignment projection(s) 182 such that the second alignment recess(es) 226 can each receive a corresponding second alignment projection(s) 182. In one or more examples of embodiments, the second alignment recess 226 can be positioned on the second side 160, while the second alignment projection 182 can be positioned on the fourth side 208. Stated another way, the second alignment recess 226 is positioned on the angle adjustment member 148 and the second alignment projection 182 is positioned on the second mounting member 144. Stated yet another way, the second side 160 of the angle adjustment member 148 includes one of the second alignment projection 182 or the second alignment recess 226, and the third side 184 includes the other of the second alignment recess 226 or the second alignment projection 182.

With continued reference to FIG. 3, the second mounting member 144 includes a caster aperture 228. More specifically, the second mounting member 144 defines the caster aperture 228. The caster aperture 228 is positioned between the fourth side 208 and the outer side 212. Further, the caster aperture 228 connects with the second aperture 216 within the second mounting member 144 (shown in FIG. 7). The caster aperture 228 is configured to receive the stem 152 of the caster wheel assembly 108. As such, the caster aperture 228 is sized similarly (or complimentary) to the stem 152. In one or more examples of embodiments, the second mounting member 144 can be integrally formed with the stem 152.

With reference now to FIG. 4, the outer side 212 defines an outer surface 232 of the caster wheel adjustment assembly 132. In the illustrated embodiment the outer surface 232 is arcuate in shape. In other examples of embodiments, the outer surface 232 can have any suitable or desired shape (e.g., rectangular, circular, etc.). Preferably the outer surface 232 is shaped with a rounded surface (or a surface minimizing sharp edges), as the outer surface 232 is exposed. This limits potential injury to a user or damage to an item in an environment caused by accidental or unintentional contact.

With reference back to FIG. 3, the frame member 136 can receive an end plug 236 to seal a hollow end of the frame member 136. The end plug 236 includes an annular flange 240. The annular flange 240 abuts an end surface 244 of the frame member 136 (shown also in FIG. 7). The annular flange 240 acts as a seal with the end surface 244 to prevent debris (e.g., water, dirt, etc.) from entering the hollow end of the frame member 136. The end plug 236 further includes a plug aperture 248. The plug aperture 248 extends through the end plug 236. The adjustment axis 154 extends through the plug aperture 248 (also shown in FIG. 7). More specifically, the adjustment axis 154 defines a center of the plug aperture 248. In the illustrated embodiment, the plug aperture 248 is oriented perpendicular to the frame member 136. In addition, the plug aperture 248 is oriented perpendicular to the frame axis 138.

A mounting washer 252 includes an interface side 256 (also referred to as a first side 256) and a second mounting side 260 (also referred to as a second side 260). The second mounting side 260 is positioned opposite the interface side 256. The mounting washer 252 defines a central aperture 264 (also referred to as a washer aperture 264). The washer aperture 264 extends through the interface and second mounting sides 256, 260. The adjustment axis 154 extends through the washer aperture 264. More specifically, the adjustment axis 154 defines a center of the washer aperture 264. The interface side 256 includes a washer counterbore 266. The illustrated washer counterbore 266 is concentric with the washer aperture 264 and defines a bore lip that is configured to engage a head of a fastener.

With reference to FIG. 4, the second mounting side 260 of the mounting washer 252 defines a second mounting surface 268. The second mounting surface 268 is shaped to engage the frame member 136. More specifically, the second mounting surface 268 has a shape that is complimentary to at least a portion of the frame member 136 (or to the frame member 136). In the illustrated embodiment, the second mounting surface 268 defines an arcuate, concave shape, and is configured to receive a convex portion of the cylindrical frame member 136. In other examples of embodiments, the second mounting surface 268 can be any suitable shape (e.g., flat, rectangular, etc.) that is complimentary to the frame member 136 (or portion thereof) to facilitate engagement. In other examples of embodiments, there may be one or more additional components (e.g., a washer, a damping pad, etc.) positioned between the second mounting side 260 and the frame member 136 to assist with engagement.

Figure 7:
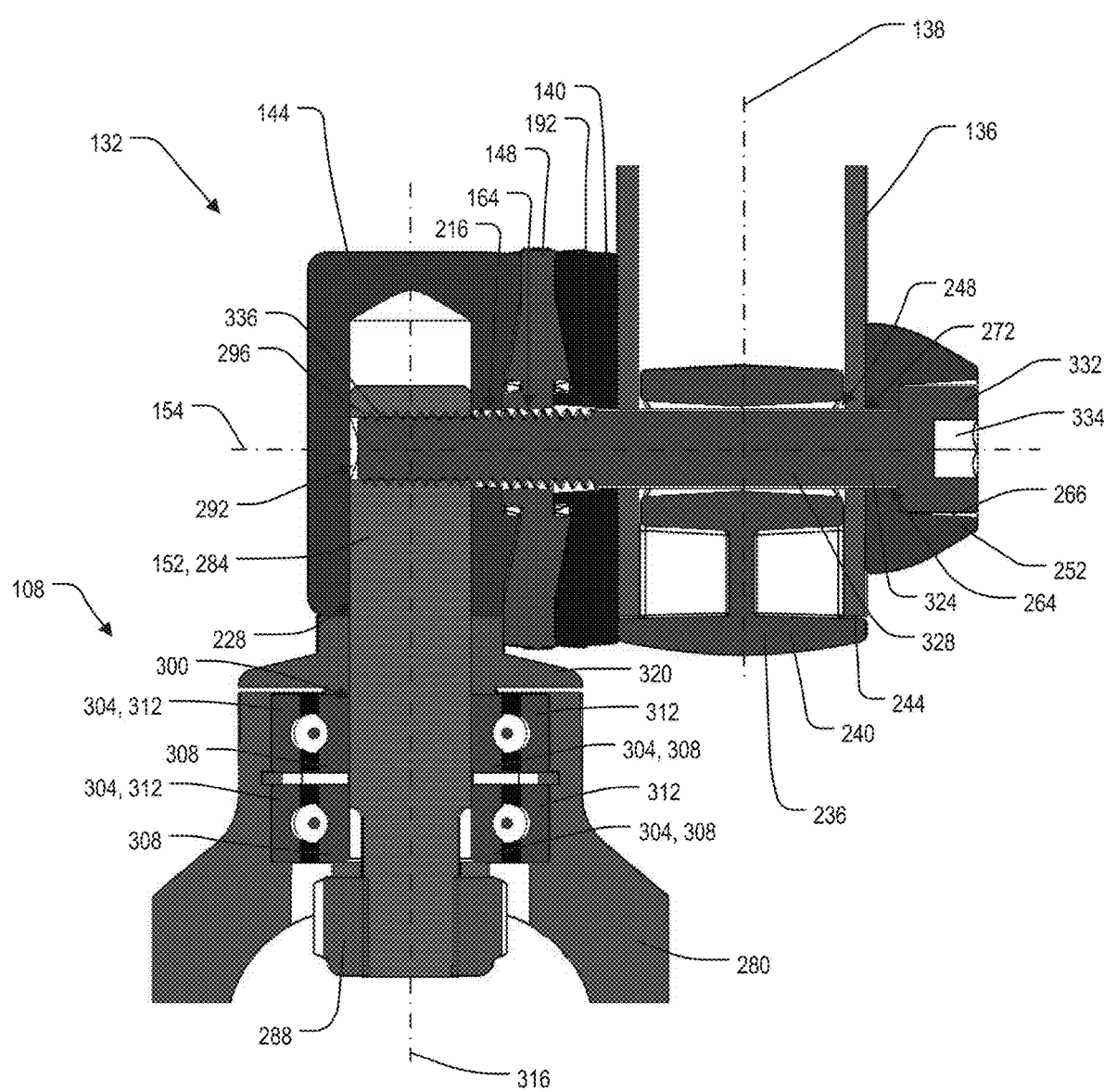
FIG. 7 is a cross-sectional view of the caster wheel adjustment assembly fastened to a portion of the frame assembly and to a portion of the caster wheel assembly, and taken along line 5-5 of FIG. 2.

As shown in FIGS. 3, 4, and 7, the frame member 136 includes a frame aperture 272. The frame aperture 272 is defined by the frame member 136 and extends through the frame member 136a. In the illustrated embodiment the frame aperture 272 extends through two opposite sides of the substantially hollow frame member 136. The adjustment axis 154 extends through the frame aperture 272 (shown in FIG. 7). More specifically, the adjustment axis 154 defines a center of the frame aperture 272.

With reference now to FIGS. 3 and 4, the caster wheel assembly 108 includes a caster wheel 276 (shown in FIG. 1), a caster frame 280, and the stem 152. The caster wheel 276 is rotatably coupled to the caster frame 280 by an axle (not shown). The stem 152 includes a stem shaft 284 and a stem head 288. The stem shaft 284 defines a stem aperture 292. The stem aperture 292 extends through the stem shaft 284. The illustrated stem aperture 292 can include a plurality of threads 296 (shown in FIG. 7). The adjustment axis 154 extends through the stem aperture 292. More specifically, the adjustment axis 154 defines a center of the stem aperture 292. The illustrated stem head 288 is coupled to the stem shaft 284. In other embodiments, the stem head 288 is integrally formed with the stem shaft 284.

With reference to FIG. 7, the stem shaft 284 extends through a caster frame aperture 300. The stem head 288 is larger than the caster frame aperture 300. As such, the stem head 288 inhibits linear movement of the stem 152 in a direction away from the caster wheel 276 (shown in FIG. 1). One or more bearings 304 (also referred to as ball bearings 304) are positioned in the caster frame 280. Each bearing 304 includes an inner race 308 and an outer race 312. Each inner race 308 is coupled to the stem shaft 284. Each outer race 312 is coupled to the caster frame 280. Each outer race 312 is configured to rotate with the caster frame 280 relative to the associated inner race 308. Each outer race 312 is also rotatable relative to a caster axis 316. The caster axis 316 is defined by the stem 152. More specifically, the caster axis 316 is defined by the stem shaft 284. Accordingly, the caster frame 280 and the caster wheel 276 (shown in FIG. 1) are rotatable (or pivotable) relative to the second mounting member 144 about the caster axis 316. The caster axis 316 intersects the adjustment axis 154. More specifically, the caster axis 316 is perpendicular to the adjustment axis 154. The second mounting member 144 and the stem 152 are configured to rotate together relative to the angle adjustment member 148 to adjust the caster axis 316 relative to the adjustment axis 154. Stated another way, the second mounting member 144 and the stem 152 are configured to rotate together relative to the angle adjustment member 148 to rotate the caster wheel 276 about (or relative to) the adjustment axis 154. In other examples of embodiments, there may only be one bearing 304 positioned in the caster frame 280. A spacer 320 can be positioned between the caster frame 280 and the second mounting member 144. The spacer 320 can be formed of a resilient material (e.g., rubber, plastic, etc.) and configured to dampen forces experienced by the caster wheel assembly 108 or the caster wheel adjustment assembly 132 along the caster axis 316.

With reference to FIGS. 3 and 7, the caster wheel adjustment assembly 132 is selectively secured (or fastened) together by a fastener 324. The caster wheel adjustment assembly 132 is also coupled (or fastened) to the frame member 136 and the caster wheel assembly 108 by the fastener 324. The fastener 324 includes a fastener shaft 328 and a fastener head 332. The fastener head 332 can include a head counterbore 334 that is shaped to receive a tool (e.g., a hex key, a screwdriver, etc.). The tool can be used to selectively rotate the fastener 324 relative to the adjustment axis 154. The fastener 324 is configured to be received by the washer aperture 264, with the fastener head 332 being received by the washer counterbore 266. The illustrated fastener head 332 is larger than the washer aperture 264. As such, the fastener head 332 inhibits lateral movement of the fastener 324 along the adjustment axis 154. The fastener shaft 328 includes a threaded portion 336. The fastener shaft 328 is configured to extend through the washer aperture 264, the frame aperture 272, the plug aperture 248, the first aperture 192, the central aperture 164, the second aperture 216, and the stem aperture 292. The threaded portion 336 is configured to engage the stem threads 296 of the stem 152 to fasten the caster wheel adjustment assembly 132 together (and fasten the caster wheel adjustment assembly 132 to both the frame member 136 and the caster wheel assembly 108). In addition, the fastener 324 is configured to maintain a selected interlock of the first and third plurality of projections 168, 196. The fastener 324 is also configured to maintain a selected interlock of the second and fourth plurality if projections 176, 220.

Figure 9:
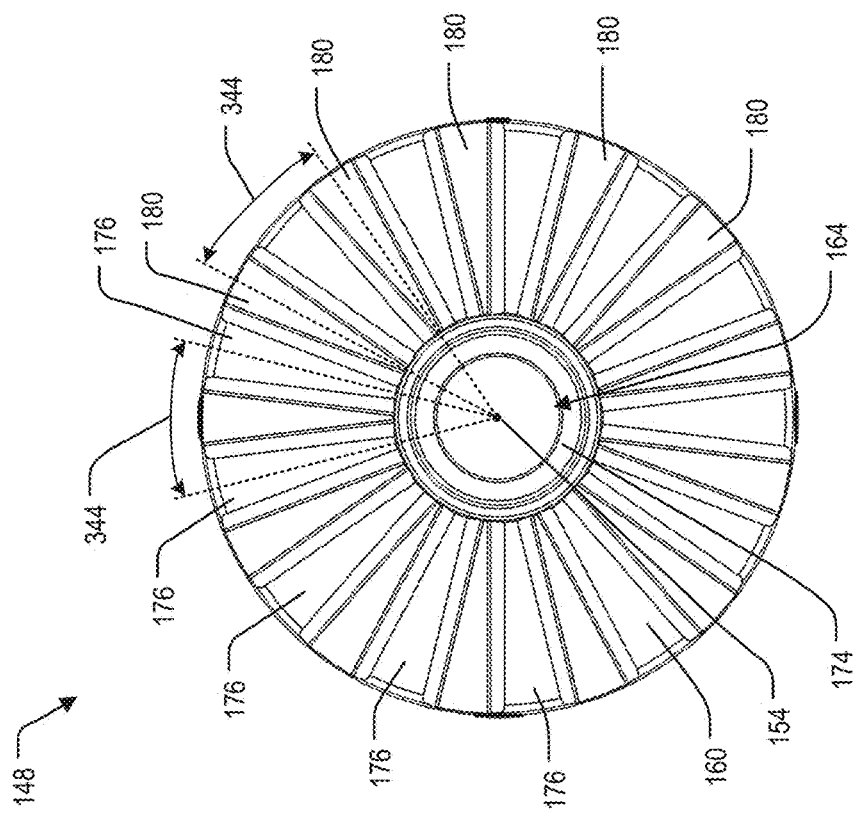
FIG. 9 is a view of the second side of the angle adjustment member of FIG. 2.
Figure 8:
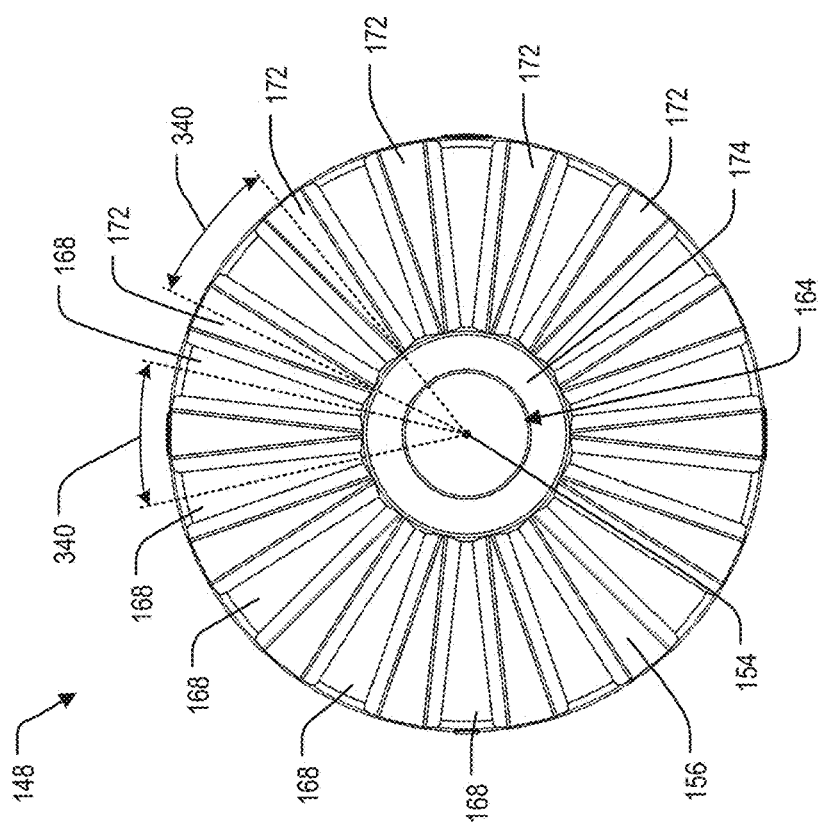
FIG. 8 is a view of the first side of the angle adjustment member of FIG. 2.

With reference now to FIGS. 8 and 9, the angle adjustment member 148 defines a different number of projections 168 and 176 on each side 156, 160. Stated another way, the first side 156 defines a plurality of first projections 168, and the second side 160 defines a plurality of second projections 176. A number of projections in the plurality of first projections 168 is different from a number of projections in the plurality of second projections 176. As shown in FIG. 8, the plurality of first projections 168 includes N number of first projections 168. N can be any suitable integer. In the illustrated embodiment, N equals fourteen, such that there are fourteen total first projections 168. In the illustrated embodiment, the first plurality of recesses 172 also includes N number of first recesses 172, and more specifically fourteen total first recesses 172. In other examples of embodiments, N can be equal to any integer. In addition, in other examples of embodiments, the number of first recesses 172 does not have to equal the number of first projections 168.

With specific reference to FIG. 9, the second plurality of projections 176 includes X number of second projections 176. X can equal any suitable integer. It should be appreciated that N and X are different. Stated another way, N and X are different numbers (or different integers). In the illustrated embodiment. X equals thirteen, such that there are thirteen total second projections 176. In the illustrated embodiment, the plurality of second recesses 180 also includes X number of second recesses 180, and more specifically thirteen total second recesses 176. In other examples of embodiments, the number of second recesses 180 does not have to equal the number of second projections 176.

As noted above, the number of first projections 168 on the first side 156 (or N projections) is different than the number of second projections 176 on the second side 160 (or X projections). In the illustrated embodiment, the first side 156 includes N number of first projections 168, and the second side 160 includes N-1 number of second projections 176. Stated another way, the second side 160 includes X number of second projections 176 and the first side 156 includes X+1 number of first projections 168. In other examples of embodiments, the first side 156 can include N number of first projections 168, while the second side 160 can include N+1, N-1, or any other suitable different number of second projections 176. In another example of an embodiment, the second side 160 can include X number of second projections 176, while the first side 156 can include X+1, X-1, or any other suitable different number of first projections 168. In other examples of embodiments, X can be equal to any integer. As such, X can be greater than N or less than N. However, X and N are not equal. The different number of projections 168, 176 on each side of the angle adjustment member 148 allow for angular adjustment of the caster wheel assembly 108 (and associated caster wheel 276) relative to the frame assembly 120 (and specifically the frame member 136), which is discussed in further detail below.

With reference to FIG. 8, the plurality of first projections 168 are evenly spaced (or equally spaced or circumferentially spaced) around the central aperture 164. As such, each first projections 168 is circumferentially offset from an adjacent first projection 168 by a first angular distance 340. Similarly, the first recesses 172 are evenly spaced (or equally spaced or circumferentially spaced) around the central aperture 164. As such, each first recess 172 is circumferentially offset from an adjacent first recess 172 by the first angular distance 340. The first angular distance 340 is equal to 360° divided by N number of first projections 168. In the illustrated embodiment, the first angular distance 340 is equal to 360° divided by fourteen first projections 168 (=360°/14) or approximately 25.71°. In the illustrated embodiment, the first angular distance 340 is the same between adjacent first projections 168 and between adjacent first recesses 172. In embodiments with a different number of recesses 172 than projections 168, the angular distance between adjacent first recesses 172 can be equal to 360° divided by the total number of first recesses 172.

With reference back to FIG. 9, the second projections 176 are evenly spaced (or equally spaced or circumferentially spaced) around the central aperture 164. As such, each second projection 176 is circumferentially offset from an adjacent second projection by a second angular distance 344. Similarly, the second recesses 180 are evenly spaced (or equally spaced or circumferentially spaced) around the central aperture 164. As such, each second recess 180 is circumferentially offset from an adjacent second recess 180 by the second angular distance 344. The second angular distance 344 is equal to 360° divided by X number of second projections 176. In the illustrated embodiment, the second angular distance 344 is equal to 360° divided by thirteen second projections 176 (=360°/13) or approximately 27.69°. In the illustrated embodiment, the second angular distance 344 is the same between adjacent second projections 176 and between adjacent second recesses 180. In embodiments with a different number of recesses 180 than projections 176, the angular distance between adjacent second recesses 180 can be equal to 360° divided by the total number of second recesses 180.

Figure 10:
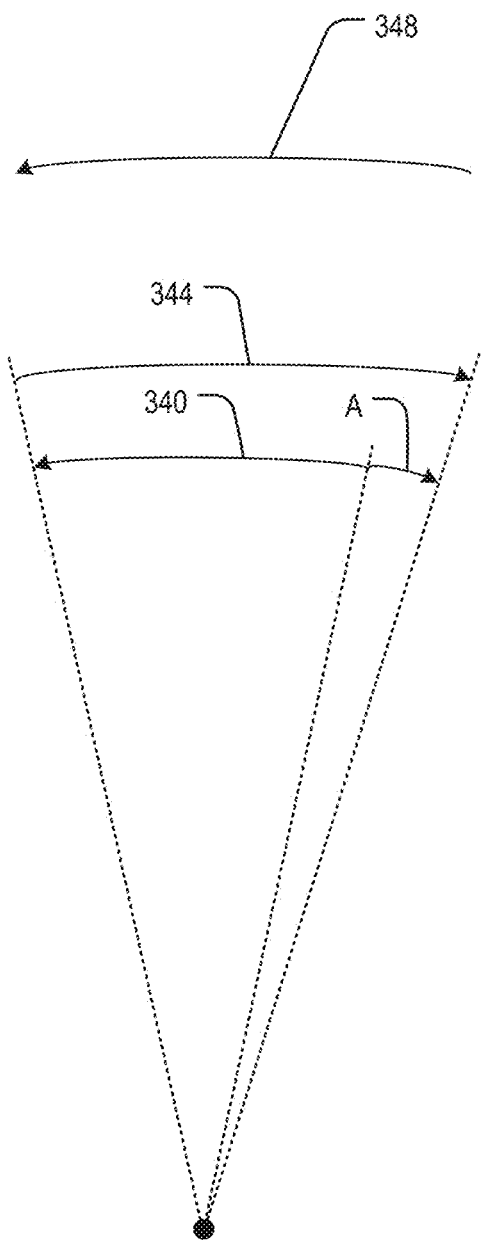
FIG. 10 is a schematic view of an example rotation of the caster wheel adjustment assembly of FIG. 2.

It should be appreciated that the different number of projections 168, 176 on each side 156, 160 of the angle adjustment member 148 provides for angle adjustability of the caster wheel assembly 108 relative to the frame member 136. With reference to FIG. 10, a difference between the first angular distance 340 and the second angular distance 344 defines an adjustment angle A (also referred to as a tolerance A). An alternative calculation for the adjustment angle A is equal to 360° divided by the product of the number of first projections 168 on the first side 156 (or N projections) times the number of second projections 176 on the second side 160 (or X projections), or (360°/(N*X)). Stated another way, the adjustment angle A is equal to the greater of the first angular distance 340 or the second angular distance 344 subtracted from the smaller of the second angular distance 344 or the first angular distance 304. As a nonlimiting example, in the illustrated embodiment, the greater second angular distance 344 less the smaller first angular distance 340 equals the adjustment angle A (or 27.69°−25.71°=1.98°). The same adjustment angle A is calculated by (360°/(N*X)) or (360°/(14*13)), which equals approximately 1.98°. It should be appreciated that the adjustment angle A can be modified by increasing (or decreasing) the number of projections 168, 176 on each side 156, 160 (or one or both sides) of the angle adjustment member 148. For example, increasing the number of first projections 168 on the first side 156 to nineteen (or N=19) and the number of second projections 176 on the second side 160 to eighteen (or X=18) changes the adjustment angle A to approximately 1.05° (or (360°/(19*18))= 1.05°). It should be appreciated that in other examples of embodiments, the number of projections 168, 176 can be modified on either (or both) sides of the angle adjustment member 148 to any suitable number to achieve a targeted or desired adjustment angle A. Thus, in one example of an embodiment, the number of first projections 168 on the first side 156 (or N projections) can be 2, 3, 4, 5, 6, 7, 8, 9, 10, 11, 12, 13, 14, 15, 16, 17, 18, 19, 20, 21, 22, 23, 24, 25, or 26 or more. The number of second projections 176 on the second side 160 (or X projections) can be 2, 3, 4, 5, 6, 7, 8, 9, 10, 11, 12, 13, 14, 15, 16, 17, 18, 19, 20, 21, 22, 23, 24, 25, or 26 or more. However, the number of first projections 168 on the first side 156 does not equal the number of second projections 176 on the second side 160 (or N≠X). Stated another way, the number of first projections 168 on the first side 156 is different than the number of second projections 176 on the second side 160. For example, the number of first projections 168 on the first side 156 can be greater than (or less than) the number of second projections 176 on the second side 160 (e.g., N>X, or N<X).

To facilitate proper alignment of the angle adjustment member 148 to the first mounting member 140 and the second mounting member 144, the projections and recesses of the mounting members 140, 144 are each respectively keyed to (or configured to interlock with) the projections and recesses of one of the sides of the angle adjustment member 148. In addition, the alignment recess 174 and alignment projection 182 of the angle adjustment member 148 are each correspondingly keyed to (or configured to interlock with) an associated alignment projection 202 and alignment recess 226 of the respective mounting member 140, 144.

The first side 156 of the angle adjustment member 148 is keyed to engage the third side 184 of the first mounting member 140. Accordingly, the plurality of first projections 168 and first recesses 172 are in a complimentary (or keyed or interlocking or mating) relationship with the third projections 196 and third recesses 200 of the first mounting member 140. As such, the third side 184 of the first mounting member 140 has the same number of third projections 196 as the number of first recesses 172 on the first side 156 of the angle adjustment member 148. In addition, the third side 184 of the first mounting member 140 has the same number of third recesses 200 as the number of first projections 168 on the first side 156 of the angle adjustment member 148. Thus, each first recess 172 receives one of the third projections 196, and each third recess 200 receives one of the first projections 168. Stated another way, each first projection 168 is received by a third recess 200, and each third projection 196 is received by a first recess 172.

Similarly, the second side 160 of the angle adjustment member 148 is keyed to engage the fourth side 208 of the second mounting member 144. The plurality of second projections 176 and second recesses 180 are in a complimentary (or keyed or interlocking or mating) relationship with the fourth projections 220 and fourth recesses 224 of the of the second mounting member 144. As such, the fourth side 208 of the second mounting member 144 has the same number of fourth projections 220 as the number of second recesses 180 on the second side 160 of the angle adjustment member 148. In addition, the fourth side 208 of the second mounting member 144 has the same number of fourth recesses 224 as the number of second projections 176 on the second side 160 of the angle adjustment member 148. Thus, each second recess 180 receives one of the fourth projections 220, and each fourth recess 224 receives one of the second projections 176. Stated another way, each second projection 176 is received by a fourth recess 224, and each fourth projection 220 is received by a second recess 180.

To further facilitate proper alignment of the angle adjustment member 148 relative to the first mounting member 140 and the second mounting member 144, the angle adjustment member 148 includes the first alignment recess 174 and the second alignment projection 182 on either side 156, 160. The first alignment recess 174 is configured receive the first alignment projection 202, while the second alignment projection 182 is configured to be received by the second alignment recess 226. As such, the first mounting member 140 includes one of the first alignment projection 202 or the second alignment recess 226, while the second mounting member 144 includes the other of the second alignment recess 226 or the first alignment projection 202. The first side 156 of the angle adjustment member 148 includes either the first alignment recess 174 or second alignment projection 182, whichever is complimentary to the projection 202 or recess 226 on the first mounting member 140. Similarly, the second side 160 of the angle adjustment member 148 includes the other of the second alignment projection 182 or the first alignment recess 174, whichever is complimentary to the projection 202 or recess 226 on the second mounting member 144. It should be appreciated that the alignment projections and recesses assist with aligning the angle adjustment member 148 to the proper mounting member 140, 144 as the projection 182 on the angle adjustment member 148 cannot engage the projection 202 on the mounting member 140, 144. Both raised projections 182, 202 block the projections and recesses of the angle adjustment member 148/mounting member 140 (or 144) from being placed into complementary (or interlocking or mating) engagement as not only are the projections and recesses of a differing number (and thus are not configured to mate or interlock), but the projections 182, 202 do not allow the projections and recesses to have sufficient contact to attempt to interlock.

The angle adjustment member 148 is configured to rotate relative to the first mounting member 140 and the second mounting member 144 in a direction of rotation. The direction of rotation is either a first direction 348 (shown in FIG. 3), or in a second direction opposite the first direction 348 (shown in FIG. 3). The angle adjustment member 148 is configured to rotate about (or rotates around) the adjustment axis 154. Following rotation, the angle adjustment member 148 can index (or incrementally circumferentially rotate) relative to one (or both) mounting members 140, 144. It should be appreciated that the term index can mean the angle adjustment member 148 rotates such that each projection disengages its associated recess, and then rotates such that each projection is repositioned into engagement with an adjacent recess in the selected direction of rotation. With each index, the angle adjustment member 148 changes the orientation of the second mounting member 144 relative to the first mounting member 140 by the adjustment angle A. Accordingly, rotating the angle adjustment member 148 by a plurality of indexes (I, where I is an integer), the adjustment angle A is changed by the number of indexes I (or(A*I)). Stated another way, the indexed (or change in) adjustment angle is the product of the adjustment angle A and the number of indexes. As a nonlimiting example, rotating one projection from engagement with a starting recess to engagement with a new recess, the new recess being three recesses (or positions) recesses away from the starting recess, the calculated angular change is the product of the adjustment angle A and the number of indexes I, which is 3 in this example. Using the angular orientation of the illustrated embodiment to supplement this example, each index of the angle adjustment member 148 changes the orientation of the mounting members 140, 144 relative to each other by 1.98°. Indexing the angle adjustment member 148 such that a projection rotates three recesses away from the starting recess, the indexed adjustment angle changes by 5.94° (or 1.98°*3). This in turn rotates (or repositions) the caster wheel assembly 108 relative to the frame member 136 by the indexed adjustment angle. It should be appreciated that the indexed adjustment angle can be measured by rotation of one of the projections 168, 176, 196, 220 relative to the associated complimentary recesses 172, 180, 200, 224. Alternatively, the indexed adjustment angle can be measured by rotation of one of the recesses 172, 180, 200, 224 relative to the associated complimentary projections 168, 176, 196, 220.

To assist with measuring (or tracking) rotation of the angle adjustment member 148 relative to the first mounting member 140 and the second mounting member 144, the angle adjustment member 148 can optionally include orientation indicia 352a, b (shown in FIG. 4). A first indica 352a can be positioned on the angle adjustment member 148 while a second indica 352b can be positioned on the first mounting member 140. The indicia 352a, b can be aligned, or moved out of alignment in response to rotation of the angle adjustment member 148. The indicate 352a, b can provide visual guidance as to the selected indexed adjustment angle (or changes thereto). In other examples of embodiments, the second indica 352b can be positioned on the second mounting member 144, or on both the first and second mounting members 140, 144.

Figure 11:
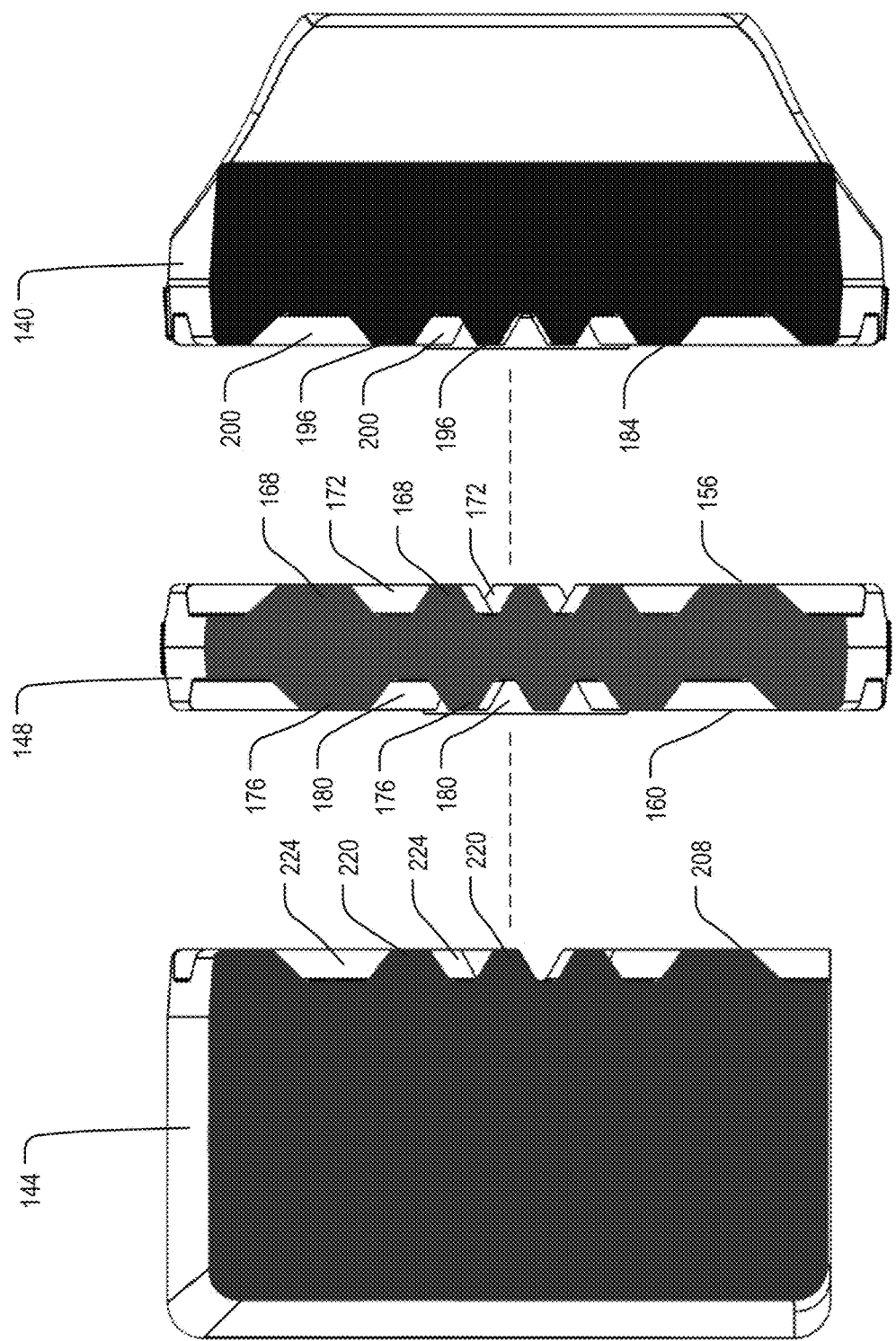
FIG. 11 is a cross-section view of the first mounting member, the second mounting member, and the angle adjustment member of the caster wheel adjustment assembly taken along line 11-11 of FIG. 2.

With reference now to FIG. 11, the illustrated projections 168, 176, 196, 220 have the same shape. More specifically, the projections 168, 176, 196, 220 has the same cross-sectional shape and the same radial shape. As illustrated, the each projection 168, 176, 196, 220 defines a generally trapezoidal cross-sectional shape with the narrower of the parallel base sides extending away from the wider of the parallel base sides. In other examples of embodiments, the projections 168, 176, 196, 220 can have a triangular, square, or any other suitable cross-sectional shape. In yet other examples of embodiments, one mating pair of projections 168, 196 or 176, 220 can have a first cross-sectional shape, and the other mating pair of projections 176, 220 or 168, 196 can have a second, different cross-sectional shape. It should be appreciated that the recesses 180, 224, 172, 200 have a cross-sectional shape that is complementary to the associated projections such that each recess can receive one of the complementary projections.

Figure 6:
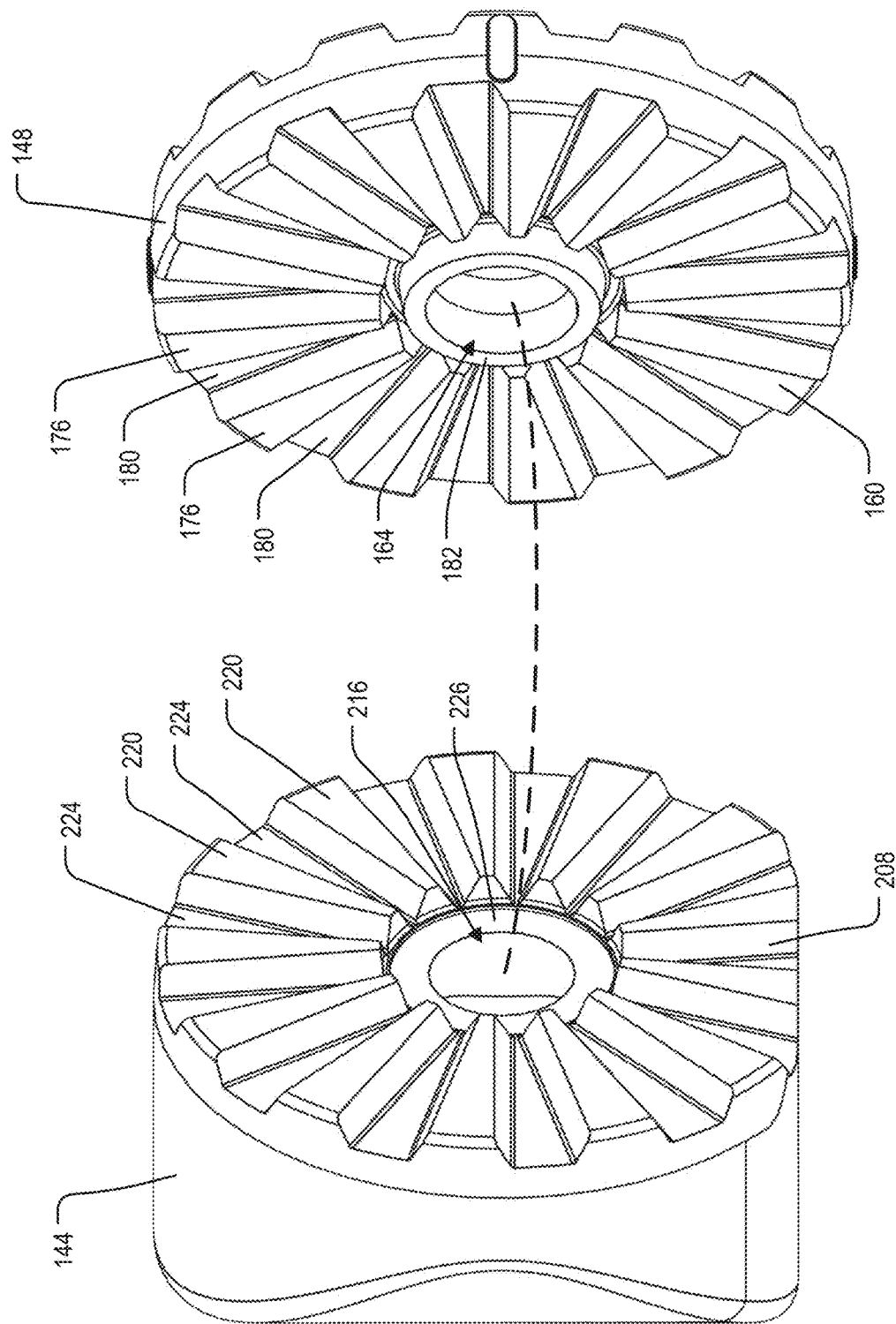
FIG. 6 is a perspective view of the angle adjustment member and a second mounting member of the caster wheel adjustment assembly of FIG. 2 in a disengaged configuration, the angle adjustment member and the second mounting member shown as oriented at an angle relative to each other to illustrate respective sides that are configured to interlock.

With reference back to FIGS. 5 and 6, each of the projections 168, 176, 196, 220 has a triangular (or elongated trapezoidal or pie shaped) radial profile (or radial shape). A circumferential width of each projection 168, 176, 196, 220 increases radially outward from the respective aperture 164, 192, 216 towards an outer circumference of the respective member 140, 144, 148. In other examples of embodiments, each projection 168, 176, 196, 220 can have any suitable radial profile (or radial shape). It should be appreciated that the recesses 180, 224, 172, 200 have a radial profile that is complementary to the associated projections such that each recess can receive one of the complementary projections.

With reference to FIG. 7, the caster wheel adjustment assembly 132 is assembled by inserting the stem shaft 284 of the caster wheel assembly 108 into the caster aperture 228 of the second mounting member 144 along the caster axis 316. In addition, the end plug 236 is inserted into the frame member 136. along the frame axis 138. The components of the caster wheel adjustment assembly 132 are then horizontally aligned. More specifically, the first mounting member 140 engages the first side 156 of the angle adjustment member 148, while the second mounting member 144 engages the second side 160 of the angle adjustment member 148. Once engaged, the first, second, and central apertures 192, 164, 216 are aligned. The aligned apertures 216, 164, 192 are then aligned with the frame aperture 272, with the frame aperture 272 being aligned with the plug aperture 248. The fastener 324 is then inserted through the washer aperture 264, and the aligned apertures 272, 248, 192, 164, 216. The threaded portion 336 of the fastener 324 then engages (or threadedly engages) the stem threads 296 of the stem aperture 292. This fastener 324 is rotated relative to the adjustment axis 154 to selectively fastens the angle adjustment member 148 to the first and second mounting members 140, 144. In turn, this selectively fastens the caster wheel adjustment assembly 132 to the caster wheel assembly 108 and the frame member 136.

During operation, the wheelchair 100 can be customized to fit to a shape and/or size of a user. Customization of the wheelchair 100 can cause the caster wheel 108 and/or the caster axis 316 to be misaligned relative to the frame axis 138. In one example of an embodiment, the caster axis 316 can be positioned to be non-parallel with the frame axis 138. It can be desirable to have the caster axis 316 oriented to be parallel (or approximately parallel) with the frame axis 138. As such, to account for wheelchair customization while also attempting to achieve a preferred (or targeted) alignment of the caster wheel 108 to the frame member 136 (or caster axis 316 to the frame axis 138), the angle adjustment member 148 is adjustable to change the orientation of the caster axis 316 relative to the frame axis 138 (or the caster wheel 108 relative to the frame member 136).

To adjust the orientation of the caster axis 316 relative to the frame axis 138 (or the orientation of the caster wheel 108 relative to the frame member 136), the fastener 324 is loosened. As the fastener 324 rotates relative to the adjustment axis 154 in a first direction, the angle adjustment member 148 disengages from the first mounting member 140 and/or the second mounting member 144. More specifically, at least one mating pair of projections 168, 196 or 176, 220 is removable from the complimentary recesses 200, 172 or 224, 180. More specifically, the first projections 168 can be removed from the third recesses 200, and the third projections 196 can be removed from the first recesses 172. This frees the angle adjustment member 148 to rotate relative to the first mounting member 140. In addition, the second projections 176 can be removed from the fourth recesses 224, and the fourth projections 220 can be removed from second recesses 180. This frees the angle adjustment member 148 to rotate relative to the second mounting member 144. In response to rotation of the second mounting member 144 relative to the angle adjustment member 148, the stem 152 of the caster wheel assembly 108 is configured to rotate with the second mounting member 144. This facilitates rotation of the caster wheel assembly 108 relative to the angle adjustment member 148, and further rotation of the caster wheel assembly 108 relative to the frame member 136 of the wheelchair 100. It should be appreciated that based on a desired adjustment, the angle adjustment member 148 can be disengaged to facilitate rotation relative to either the first mounting member 140 or the second mounting member 144, or alternatively to facilitate rotation relative to both the first mounting member 140 and the second mounting member 144.

Once disengaged, the angle adjustment member 148 can be rotated relative to the first mounting member 140 and/or the second mounting member 144 in either the first direction 348 or a second direction opposite the first direction 348. The angle adjustment member 148 can be rotated an angular distance A, or a plurality of angular distances A, to the selected indexed adjustment angle. In effect, the angle adjustment member 148 is rotated to achieve a desired orientation of the caster axis 316 relative to the frame axis 138, as each indexed rotation of the angular adjustment member 148 rotates the caster axis 316 relative to the frame axis 138 by the adjustment angle A. Stated another way, each indexed rotation of the angular adjustment member 148 rotates the caster wheel assembly 108 relative to the frame member 136 by the adjustment angle A, and more specifically the caster wheel 276 relative to the frame member 136 by the adjustment angle A.

Once a desired orientation of the caster axis 316 to the frame axis 138 is achieved, or a desired orientation of the caster wheel assembly 108 relative to the frame member 136, or a desired orientation of the caster wheel 276 relative to the frame member 136 is achieved, the angle adjustment member 148 is reengaged with the first mounting member 140 and/or the second mounting member 144. More specifically, the fastener 324 is tightened. As the fastener 324 rotates relative to the adjustment axis 154 in a second direction, the angle adjustment member 148 engages from the first mounting member 140 and/or the second mounting member 144. More specifically, the projections 168, 196 and/or 176, 220 is received by the complimentary recesses 200, 172 and/or 224, 180. More specifically, each first projection 168 is received by one of the third recesses 200, and each third projection 196 is received by one of the first recesses 172. Optionally, or in addition, each second projection 176 is received by one of the fourth recesses 224, and each fourth projections 220 is received by one of the second recesses 180. This positions the first side 156 of the angle adjustment member 148 into mating engagement with the first mounting member 140, and the second side 160 of the first mounting member 140 into mating engagement with the second mounting member 144.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A caster wheel adjustment assembly for a wheelchair comprising:
   a first mounting member coupled to a frame member of the wheelchair;
   a second mounting member coupled to a caster wheel; and
   an angle adjustment member defining a first side opposite a second side and a central aperture extending from the first side to the second side, the first side defining a plurality of first projections and an alignment recess, and the second side defining a plurality of second projections and an alignment projection, the plurality of first projections include a different number of projections than the plurality of second projections, the alignment recess being concentric with the central aperture, and the alignment projection being concentric with the central aperture,
   wherein the first mounting member defines a plurality of third projections, the first and third projections are configured to interlock in response to the angle adjustment member being selectively fastened to the first mounting member,
   wherein the second mounting member defines a plurality of fourth projections, the second and fourth projections are configured to interlock in response to the angle adjustment member being selectively fastened to the second mounting member, and
   wherein in response to rotation of the angle adjustment member relative to the first mounting member and/or the second mounting member, the caster wheel is angularly adjusted relative to the frame member.

2. The caster wheel adjustment assembly of claim 1, wherein the plurality of first projections include N number of projections, and the plurality of second projections include N+1 number of projections.

3. The caster wheel adjustment assembly of claim 1, wherein the plurality of first projections include N number of projections, and the plurality of second projections include X number of projections, wherein N is greater than X.

4. The caster wheel adjustment assembly of claim 1, wherein the plurality of first projections include N number of projections, and the plurality of second projections include X number of projections, wherein N is less than X.

5. The caster wheel adjustment assembly of claim 1, wherein the plurality of first projections extend radially from the central aperture.

6. The caster wheel adjustment assembly of claim 1, wherein, the plurality of second projections extend radially from the central aperture.

7. The caster wheel adjustment assembly of claim 1, wherein the first mounting member defines a second alignment projection configured to be received by the alignment recess of the angle adjustment member, and wherein the second mounting member defines a second alignment recess configured to receive the alignment projection of the angle adjustment member.

8. The caster wheel adjustment assembly of claim 1, wherein the angle adjustment member defines an alignment projection on the first side, and an alignment recess on the second side, the alignment recess being concentric to the central aperture, and the alignment projection being concentric to the central aperture.

9. The caster wheel adjustment assembly of claim 8, wherein the first mounting member defines a second alignment recess configured to receive the alignment projection of the angle adjustment member, and wherein the second mounting member defines a second alignment projection configured to be received by the alignment recess of the angle adjustment member.

10. The caster wheel adjustment assembly of claim 1, wherein the first mounting member defines a first aperture, the second mounting member defines a second aperture, and the angle adjustment member defines a third aperture, wherein in response to the first mounting member engaging the first side of the angle adjustment member and the second mounting member engaging the second side of the angle adjustment member, the first, second, and third apertures are in alignment.

11. The caster wheel adjustment assembly of claim 10, wherein the aligned first, second, and third apertures are configured to receive a fastener to selectively fasten the angle adjustment member to the first and second mounting members.

12. The caster wheel adjustment assembly of claim 1, further comprising:
the first side of the angle adjustment member defining a plurality of first recesses, and the second side of the angle adjustment member defining a plurality of second recesses,
wherein the plurality of first projections and plurality of first recesses alternate around a circumference of the first side of the angle adjustment member, and the plurality of second projections and plurality of second recesses alternate around a circumference of the second side of the angle adjustment member.

13. The caster wheel adjustment assembly of claim 1, wherein in response to angular adjustment of the caster wheel relative to the frame member, the caster wheel is configured to rotate relative to an axis perpendicular to the frame member.

14. A caster wheel adjustment assembly for a wheelchair comprising:
an angle adjustment member defining a first side opposite a second side, the first side defining a first plurality of projections, and the second side defining a second plurality of projections, the first plurality of projections are each spaced apart by a first angular distance, and the second plurality of projections are each spaced apart by a second angular distance that is different than the first angular distance;
a first mounting member coupled to a frame member of the wheelchair, the first mounting member defining a third plurality of projections complimentary to the first plurality of projections, the frame member defining a frame axis; and
a second mounting member coupled to a stem of a caster wheel, the second mounting member defining a fourth plurality of projections complimentary to the second plurality of projections, the stem defining a caster axis offset from the frame axis,
wherein the first mounting member is configured to selectively fasten to the angle adjustment member, the first and third plurality of projections configured to interlock,
wherein the second mounting member is configured to selectively fasten to the angle adjustment member, the second and fourth plurality of projections configured to interlock, and
wherein in response to rotation of the angle adjustment member relative to the first mounting member and/or the second mounting member, the angular position of the caster wheel stem changes relative to the frame member, and
wherein the angle adjustment member is positioned between the frame axis and the caster axis.

15. The caster wheel adjustment assembly of claim 14, wherein the second mounting member defines an aperture that receives the stem of the caster wheel, the second mounting member and the stem are configured to rotate together relative to the angle adjustment member.

16. The caster wheel adjustment assembly of claim 14, wherein the first plurality of projections include N number of projections, the second plurality of projections include X number of projections, and N is different than X.

17. The caster wheel adjustment assembly of claim 14, wherein the angle adjustment member defines a central aperture, the first plurality of projections and second plurality of projections radially extend from the central aperture.

18. The caster wheel adjustment assembly of claim 17,
wherein the first mounting member defines a first aperture, and the second mounting member defines a second aperture, and
wherein in response to the first and third plurality of projections interlocking, and the second and fourth plurality of projections interlocking, the first aperture, central aperture, and second aperture are aligned and configured to receive a fastener.

19. The caster wheel adjustment assembly of claim 14, wherein the first mounting member is positioned between the frame axis and the caster axis.

20. The caster wheel adjustment assembly of claim 19, wherein a portion of the second mounting member is positioned between the frame axis and the caster axis.

* * * * *